LINEAR ANALOG CONVERSION

Filed Sept. 4, 1968

2 Sheets-Sheet 1

INVENTOR.
D. A. FLUEGEL

INVENTOR.
D. A. FLUEGEL 3,549,998

LINEAR ANALOG CONVERSION

Dale A. Fluegel, Bartlesville, Okla., assignor to Phillips Petroleum Company, a corporation of Delaware Filed Sept. 4, 1968, Ser. No. 757,245
Int. Cl. G01r 19/26, 15/10
U.S. Cl. 324—120 3 Claims

ABSTRACT OF THE DISCLOSURE

The output of a non-linear transducer is linearized by a Zener diode function generator and applied to an analog-to-digital converter. The function generator includes a set of output terminals with a plurality of potentiometers connected by their end terminal across the function generator output terminals and a plurality of series connected Zener diode and resistor units connected in parallel between an input terminal of the function generator and respective taps on the potentiometers.

This invention relates to an improved apparatus for regulating the characteristics of electronic equipment which is used to perform operations on analog signals. In another aspect, it relates to an improved voltage to frequency conversion apparatus in which it is possible to accurately control the linearity of the voltage-frequency characteristics.

The use of analog system for monitoring production processes has made it necessary to design equipment which will translate the analog data into a more usable and understandable form. Due to the increasing use of digital equipment to record and control processes, it is often desirable to convert an analog voltage to a digital representation. In the circuits designed for this purpose, there often arises a nonlinearity between the analog voltage and the digital signal.

In accordance with the present invention, the linearity of an analog conversion system can be varied by proper alteration of the analog signal. In accordance with another aspect of this invention, the linearity of an analog to digital conversion can be varied by proper alteration of the analog input. In accordance with still another aspect of this invention, the linearity of a voltage to frequency conversion system can be varied by proper alteration of the voltage input.

It is an object of this invention to provide improved apparatus for linearity control in analog conversion system.

Another object is to provide improved apparatus for linearity control in analog to digital conversion system.

Another object is to provide improved apparatus for linearity control of a voltage to frequency conversion system.

Figure 2:
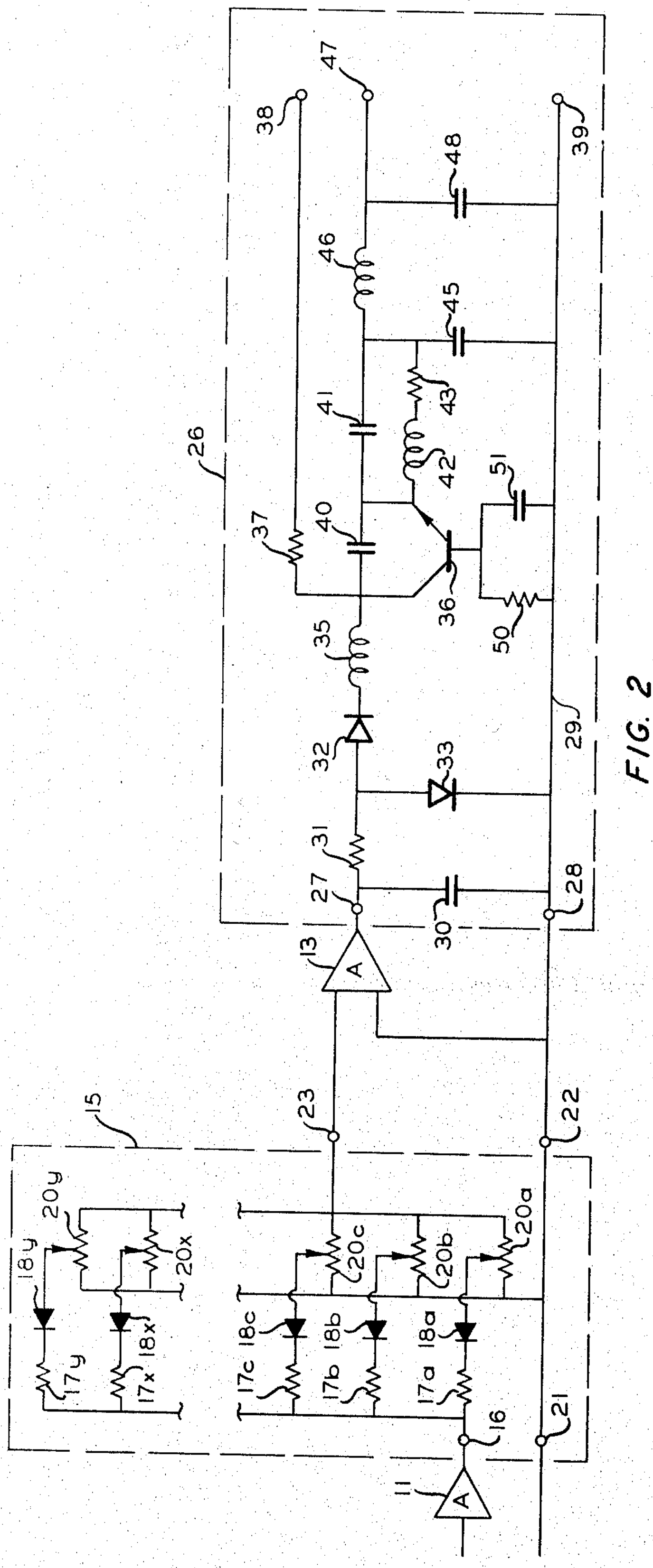
Figure 1:
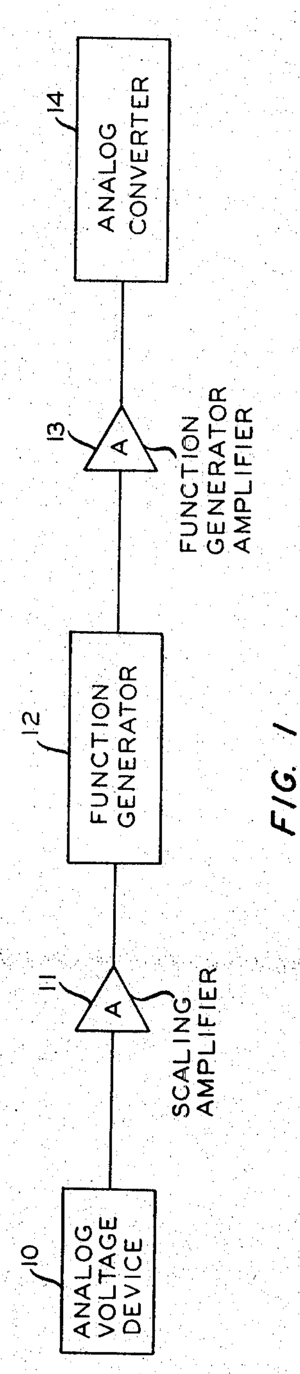
Figure 3:
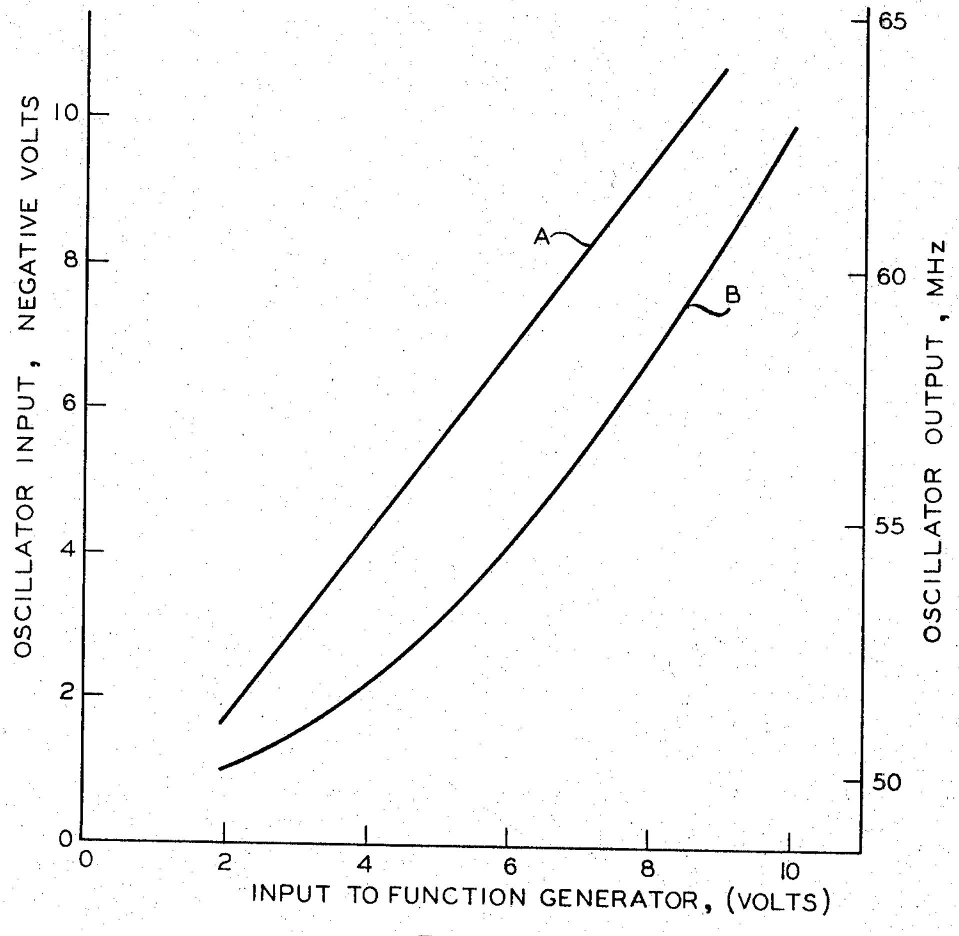

Other objects, advantages and features of the invention should become apparent from the following detailed description, taken in conjunction with the accompanying drawings in which:

FIG. 1 is a schematic block diagram which shows the general use to which this invention can be put in an analog system. FIG. 2 is a schematic circuit drawing of an embodiment of the invention in a voltage to frequency conversion system. FIG. 3 is a graphical representation of the alteration in linearity of an input voltage which can be achieved in a circuit utilizing the invention.

Referring now to the drawing in detail and to FIG. 1, in particular, there is shown an analog voltage source 10 which is representative of any type of transducing element, such as a temperature, pressure, or flow measuring device, which produces a D.C. output voltage representative of a process or condition to be measured. A scaling amplifier 11 accepts the output of the analog voltage source 10 and performs any necessary magnitude variation on the analog signal. The amplified signal is then fed to a function generator 12 which is representative of any circuit element having the desired nonlinear voltage characteristics. A function generator amplifier 13 then amplifies or otherwise alters the signal so that it is in a form which can be readily accepted by the analog converter 14, which is representative of any device which performs an operation on or changes the form of analog data.

FIG. 2 shows the scaling amplifier 11 transmitting a D.C. voltage to a Zener diode function generator 15 in which the more electrically positive voltage signal from the scaling amplifier 11 is connected to the generator input signal terminal 16, which is in turn connected to any number of resistors 17*a*, 17*b*, 17*c* . . . 17*x*, 17*y*. The other ends of resistors 17*a*, 17*b*, 17*c* . . . 17*x*, 17*y* are connected respectively to the cathodes of Zener diodes 18*a*, 18*b*, 18*c* . . . 18*x*, 18*y*. The anodes of Zener diodes 18*a*, 18*b*, 18*c* . . . 18*x*, 18*y* are connected to the movable contacts of potentiometers 20*a*, 20*b*, 20*c* . . . 20*x*, 20*y*. The less electrically positive common lead enters the Zener diode function generator 15 at the common generator input terminal 21, which is connected directly to the common generator output terminal 22, and one of the fixed terminals of each of the potentiometers 20*a*, 20*b*, 20*c* . . . 20*x*, 20*y*. The other fixed terminals of the potentiometer 20*a*, 20*b*, 20*c* . . . 20*x*, 20*y* are connected to the generator output signal terminal 23.

In the function generator amplifier 13, the signal voltage is amplified and inverted so that the voltage applied to the oscillator input signal terminal 27 of the variable frequency oscillator 26 is electrically less positive than the oscillator common terminal 28. Oscillator common terminal 28 is connected through oscillator common connector 29 to oscillator output terminal 39. Capacitor 30 is connected between the oscillator input signal terminal 27 and the oscillator common connector 29, and the oscillator input signal terminal 27 is connected through resistor 31 to anodes of the voltage sensitive capacitors 32 and 33. The cathode of voltage sensitive capacitor 33 is connected to the oscillator common connector 29, and the cathode of voltage sensitive capacitor 32 is connected through inductor 35 to the collector of transistor 36, which is in turn connected through resistor 37 to oscillator frequency output terminal 38 and through capacitor 40 to the emitter of transistor 36. The emitter of transistor 36 is also connected to capacitor 41 and through inductor 42 to resistor 43. The other end of resistor 43 is connected to capacitor 41 on the side opposite the emitter of transistor 36, and is also connected through capacitor 45 to the oscillator common connector 29 and through inductor 46 to the oscillator power supply terminal 47. Capacitor 48 connects the oscillator power supply terminal 47 and the oscillator common connector 29. Connected in parallel between the base of transistor 36 and the oscillator common connector 29 are resistor 50 and capacitor 51.

By adjusting the value of the components in the Zener diode function generator 15, the accuracy of the breakdown voltages of the Zener diodes 18*a*, 18*b*, 18*c* . . . 18*x*, 18*y* makes it possible to obtain a precision of $\pm 0.05\%$ in the variation of the linearity of the output frequency of the variable frequency oscillator 26, as compared to the input voltage to the Zener diode function generator 15 when the precision of the resistors 17*a*, 17*b*, 17*c* . . . 17*x*, 17*y* is $\pm 1\%$. In similar circuits not utilizing Zener diodes, resistor accuracy of $\pm 0.01\%$ is necessary in order to obtain the same results. In applications where less accuracy is desired, the Zener diode function generator 15 can be replaced by a less precise nonlinear element such as a thyrite element.

FIG. 3 shows as line A the overall linear relationship between function generator input (abscissa axis) and oscillator output frequency (right ordinate axis), which can be achieved by using a circuit similar to that of FIG. 2. Such a relationship is achieved by combining with the inherent nonlinearity of the conversion system, the proper corrective nonlinearity of a Zener diode function generator. The necessary corrective nonlinearity is shown as curve B, which represents the oscillator input (left ordinate axis) as related to the function generator input (abscissa axis).

Inherent nonlinearities are present in many analog detection devices. A thermistor or other element which has a resistance which varies with its temperature, for example, does not normally have a linear temperature to resistance relationship. Costly measures are often taken to attempt to linearize each element of a system as much as possible in order to make the overall system more linear. In accordance with the present invention, the insertion of one carefully selected nonlinear element can be substituted for attempts to improve the individual linearity of each of the other elements of the system.

By examining the linearity of an analog system without a function generator, the amount of nonlinearity which should be introduced in order to make the overall system linear can be determined by graphically or otherwise subtracting the original nonlinear output characteristic from the desired linear one. Once the curve of the nonlinearity sought to be introduced is known, a Zener diode function generator can be built to generate the desired nonlinearity by approximating the curve with straight line segments. The choice of breakdown voltages for the various diodes will determine the break points of the successive straight line segments, and the slope of each segment will be determined by the total amount of resistance which the Zener diodes by virtue of their different breakdown voltages have placed in the circuit at any given input voltage. In constructing such a function generator, breakdown voltages are chosen close enough together so that a good approximation is possible; more Zener diodes will generally be needed for functions with a greater amount of curvature. Choice of proper resistor and potentiometer values and settings can then be made by determining the amount of total resistance necessary for the required voltage drop for a given range of input voltages, and choosing resistances and potentiometer settings which will result in the desired value as each successive Zener diode adds a parallel resistance at its breakdown point.

Among the numeorus advantages of linearization of the input-output characteristics of an analog system is the ease with which such a linear signal can be converted to other forms. For example, when the variable frequency oscillator of FIG. 2 has an output frequency which varies linearly with respect to the analog of the condition being measured, the output frequency can be counted directly by a high-speed computer and a digital representation obtained by simple counting without further complex conversion. In this way, the combination of a linear system and new high-speed computers can make it unnecessary to use a reference oscillator and mixer along with other complex equipment in converting an analog signal to a digital signal, as was previously necessary in performing such a conversion using a variable frequency oscillator.

The Zener diode function generator 15 as shown in FIG. 2 is designed to accept a positive voltage at generator input signal terminal 16. However, by reversing the polarity of one or more of the Zener diodes 18_a_, 18_b_, 18_c_ . . . 18_x_, 18_y_, the circuit can be made to accept positive signals, negative signals or a combination of the two. Likewise, variable frequency oscillator 26 of FIG. 2 and the function generator 12 and analog converter 14 of FIG. 1 can be designed to accept either positive or negative signals, with the function generator amplifier 13 and scaling amplifier 11 performing any polarity reversal which is necessary to make the entire system compatible.

In addition to linearization of a system, it is obvious that the invention can be used to result in a desired degree of nonlinearity when necessary.

While this invention has been described in conjunction with a presently preferred embodiment, it should be apparent that it is not limited thereto.

I claim:

1. Measuring apparatus comprising:

a first transducing element which establishes a first output voltage, the magnitude of which is representative of a condition to be measured, said first output voltage varying in accordance with a first non-linear function with respect to the magnitude of the condition to be measured;

a function generator having first and second input terminals connected to said transducing element so that said first output voltage is applied between said input terminals; first and second output terminals, said second output terminal being common with said second input terminal; a plurality of potentiometers having first end terminals connected to said first output terminal and second end terminals connected to said second output terminal; a plurality of resistors; a plurality of Zener diodes; said potentiometers having contractors and circuit means connecting respective ones of said diodes and resistors in series between the contactors of said potentiometers and said first input terminal, the values of said resistors, the settings of the contactors of said potentiometers and the breakdown voltages of said Zener diodes being such that said function generator establishes a second output voltage between said first and second output terminals which is a second non-linear function with respect to said first output voltage, said first and second functions being complementary so that the magnitude of said second output voltage is a linear function of the condition to be measured by said transducing element; and an analog-to-digital converter connected to said output terminals of said function generator.

2. The apparatus of claim 1 wherein said transducing element includes a thermistor adapted to be positioned in a region of temperature to be measured.

3. The apparatus of claim 1 wherein said converter is a variable frequency oscillator which provides an output signal, the frequency of which is proportional to the magnitude of said second output voltage.

References Cited

UNITED STATES PATENTS

| | | | |
|---|---|---|---|
| 3,064,193 | 11/1962 | Grubb et al. | 324—120 |
| 3,173,024 | 3/1965 | Peretz | 235—197X |
| 3,244,977 | 4/1966 | Folsom | 324—132X |

RUDOLPH V. ROLINEC, Primary Examiner

E. F. KARLSEN, Assistant Examiner

U.S. Cl. X.R.

324—132; 328—143